United States Patent [19]

Emmoto et al.

[11] Patent Number: 5,319,446
[45] Date of Patent: Jun. 7, 1994

[54] TEST PATTERN SIGNAL GENERATOR

[75] Inventors: Kazuo Emmoto, Nagasaki; Makoto Terazono, Osaka, both of Japan

[73] Assignee: Mitsubishi Denki Kabushiki Kaisha, Tokyo, Japan

[21] Appl. No.: 928,054

[22] Filed: Aug. 11, 1992

[30] Foreign Application Priority Data

Nov. 7, 1991 [JP] Japan ............................... 318691

[51] Int. Cl.⁵ ............................................. H04N 17/02
[52] U.S. Cl. ............................ 348/181; 348/578
[58] Field of Search ............. 358/10, 13, 139, 183, 358/22; H04N 17/02, 17/00

[56] References Cited

U.S. PATENT DOCUMENTS

| | | | |
|---|---|---|---|
| 4,414,567 | 11/1983 | Berke et al. | 358/139 |
| 4,855,820 | 8/1989 | Wischermann et al. | 358/139 |
| 5,038,210 | 8/1991 | Deckelmann et al. | 358/139 |

FOREIGN PATENT DOCUMENTS

| | | |
|---|---|---|
| 62-54180 | 3/1987 | Japan . |
| 62-198292 | 9/1987 | Japan . |
| 63-301691 | 12/1988 | Japan . |
| 1-304493 | 12/1989 | Japan . |
| 2-6766 | 1/1990 | Japan . |
| 2-296489 | 12/1990 | Japan . |

*Primary Examiner*—Victor R. Kostak
*Assistant Examiner*—Nathan J. Flynn
*Attorney, Agent, or Firm*—Burns, Doane, Swecker & Mathis

[57] ABSTRACT

A test pattern signal generator provides test patterns for a display unit. A horizontal counter counts dot clocks which correspond to display dots on the display unit respectively, and is cleared when the count value reaches the number of dot clocks in a horizontal period. A horizontal memory is addressed by the count value of the horizontal counter to output horizontal sync signal and test pattern data corresponding to each dot. A vertical counter counts clocks representing horizontal sync period outputted by the horizontal counter, and is cleared when the count value reaches the number of scan lines on a display. A vertical memory is addressed by the count value of the vertical counter to output vertical sync signal and test pattern data corresponding to each scan line. An output circuit produces a test pattern signal from outputs of the horizontal and vertical memories to provide it for the display unit.

7 Claims, 12 Drawing Sheets

| | $a_0$ $a_b$ $a_c$ | $a_e$ | $a_d$ $a_a$ |
|---|---|---|---|
| $D_0$ | 1 1---1 1 0 0 -------- | ------------ | ---0 0;--- |
| $D_1$ | 0 0---:0 0--0 0 1 1---- | ------------ | -1 1 0 0--;--- |
| $D_2$ | 0 0---:----0 1 0---- | ------------ | ---0 1 0----;--- |
| $D_3$ | | | |
| $D_4$ | 1 ~ | ~1 1 1~ | |
| $D_5$ | 1 ~ | ~1 0 1~ | |
| $D_6$ | 1 ~ | ~1 0 1~ | |
| $D_7$ | 1 ~ | ~1 0 1~ | |

TEST PATTERN SIGNAL GENERATOR

BACKGROUND OF THE INVENTION

1. Field of the Invention

The present invention relates to a test pattern signal generator for generating test pattern signals for display monitors which employ cathode ray tubes (CRTs) or liquid crystal panels.

2. Description of the Prior Art

Figure 1:
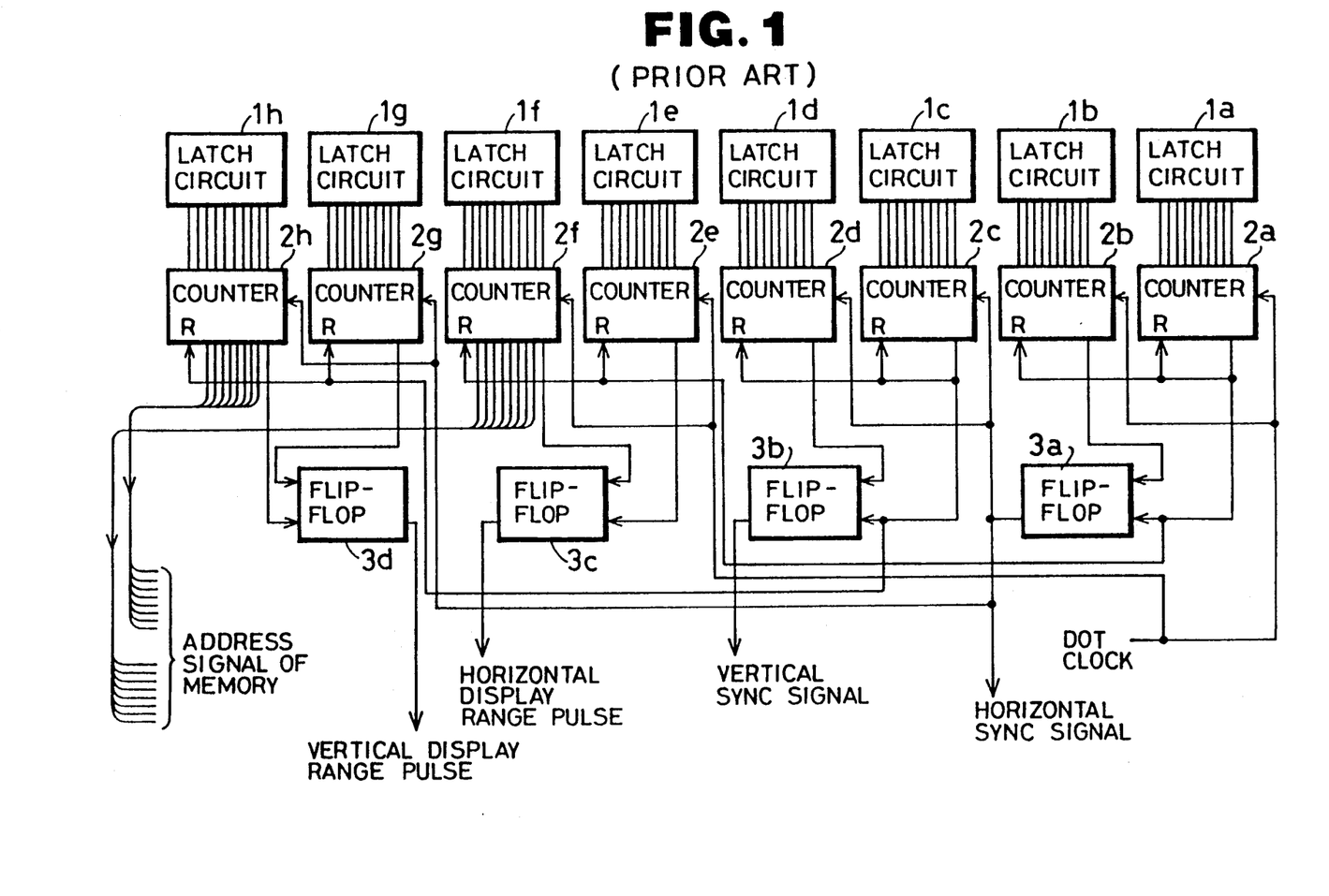
FIG. 1 is a block diagram showing a conventional test pattern signal generator.

FIG. 1 is a block diagram showing a conventional test pattern signal generator. In the figure, symbols 1a through 1h denote latch circuits which set the operational parameters of the display monitor under test, which include the frequency of sync signal, the pulse width of sync signal, and the range of data display area, to corresponding counters 2a through 2h. The counters 2a-2h count dot clocks or horizontal sync pulses, and they produce count-up signals and clear themselves when they have counted the values which were set by the respective latch circuits. Indicated by 3a through 3d are flip-flops which are set and reset in response to the count-up signals from the pairs of the counters 2a-2h thereby to produce a horizontal sync signal, vertical sync signal, horizontal data display range pulse, and vertical data display range pulse.

Figures 2A, 2B, 2C, 2D:
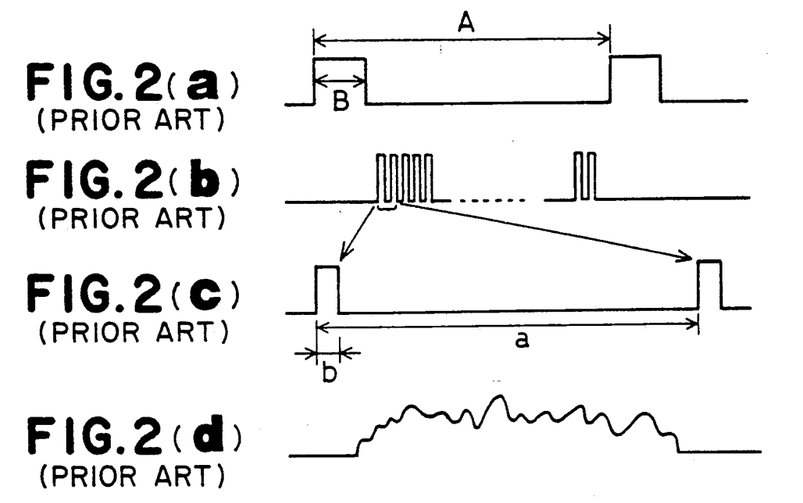
FIGS. 2(a) through 2(d) are timing charts showing the signals of a display monitor.

Next, a typical operation will be explained. FIGS. 2(a)-2(b) are timing charts showing the typical waveforms of the signals of a display monitor, in which FIG. 2(a) is the vertical sync signal, FIG. 2(b) is the horizontal sync signal, FIG. 2(c) is the horizontal sync signal with its time axis being expanded, and FIG. 2(d) is a data signal. These signals are produced by counting a clock signal having a pulse width corresponding to the minimum light spot displayed on the monitor screen, i.e., dot clocks.

The horizontal sync signal shown by FIG. 2(c) in has a period which is the total length a of dot clocks in number, and has a pulse width which is the total length b of dot clocks. The vertical sync signal shown by FIG. 2(a) has a period which is the total length of A horizontal sync pulses, and has a pulse width which is the total length of B horizontal sync pulses.

Figure 3:
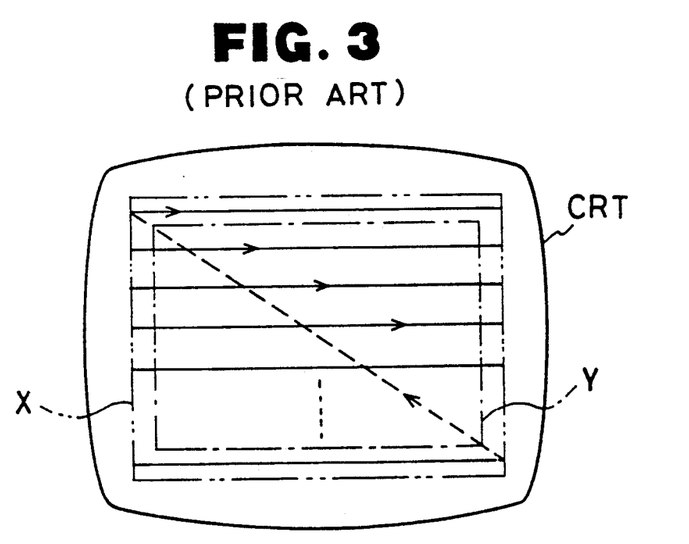
FIG. 3 is a diagram explaining the relation between the sync signal and scanning line and between the scanning line and data display area.

On the CRT screen of display monitor, the electron beam scans in a swing motion from left to right and from top to bottom as shown in FIG. 3. The vertical sync pulse is located equivalently at the left end of the first scanning line, and the horizontal sync pulse is located equivalently at the left end of each scanning line. A display monitor of this type does not use the whole scanning area enclosed by the 2-dot-and-dash line X for display, but it uses only area enclosed by the dot-and-dash line Y where scanning is stable.

Figure 4A:
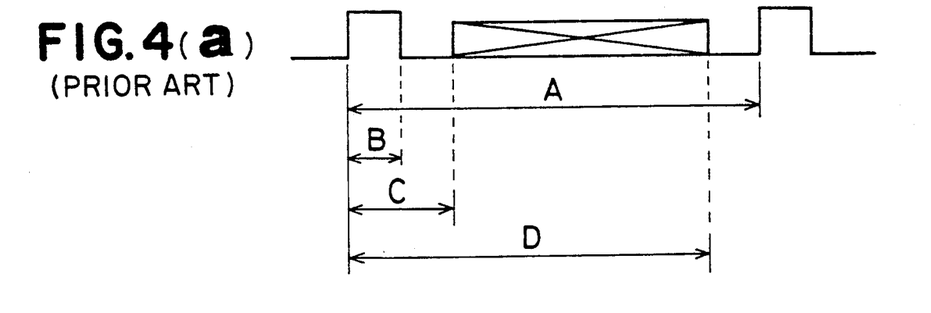
Figure 4B:
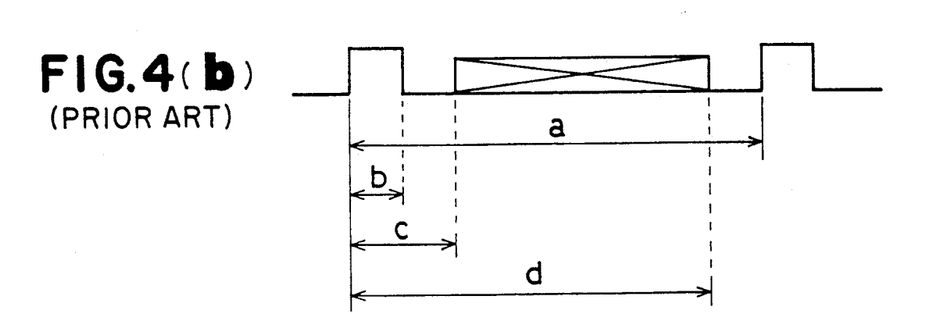

On this account, the data display area is defined in the vertical direction in terms of horizontal scanning lines from the C-th line to D-th line counted from the vertical sync pulse as shown by (a) in FIG. 4, and in the horizontal direction in terms of dot clocks from the c-th clock to the d-th clock connected from the horizontal sync pulse as shown by (b) in FIG. 4.

In the conventional test pattern signal generator, the timing signals having the values A through D and a through d shown in FIGS. 4(a) and 4(b) are produced by means of flip-flops which are set and reset in response to the counter outputs as shown in FIG. 1. Specifically, the counter 2a is set to the number of dot clocks "a" which corresponds to the horizontal sync period provided by the latch circuit 1a, and the counter 2b is set to the number of dot clocks "b" which corresponds to the horizontal sync pulse width provided by the latch circuit 1b.

The counter 2a counts dot clocks, and when it has counted the value "a" which was set by the latch circuit 1a, it produces and delivers a count-up signal to its own reset terminal and the counter 2b and to the set terminal of the flip-flop 3a. The flip-flop 3a is set by the count-up signal, and its output goes high. The counter 2b is cleared by the count-up signal, and it restarts the counting of dot clocks. When the counter 2b has counted the value "b" which was set by the latch circuit 1b, it delivers a reset signal to the flip-flop 3a. The flip-flop 3a is reset by the signal, and its output goes low. Consequently, the flip-flop 3a produces the horizontal sync signal having a period of "a" and a pulse width of "b" shown by FIG.(c).

The counters 2c and 2d operate in the same manner as 2a and 2b in response to the resulting horizontal sync signal, and the associated flip-flop 3b produces the vertical sync signal having a period of "A" and a pulse width of "B" shown by FIG.(a). Similarly, the counters 2e and 2f count dot clocks, causing the flip-flop 3c to produce the horizontal display range pulse, and the counters 2g and 2h count horizontal sync pulses, causing the flip-flop 3d to produce the vertical display range pulse. The counters 2f and 2h also deliver count values as the address signal of the memory which stores data of test patterns to be displayed.

The conventional test pattern signal generator necessitates the latch circuits 1a-1h, counters 2a-2h, and flip-flops 3a-3d for producing the horizontal sync signal, vertical sync signal, horizontal data display range pulse, and vertical data display range pulse, as described above, and because of vast count values each counter, e.g., counter 2a, is formed of three to four IC devices, resulting in an enormous hardware arrangement besides a large-capacity memory for generating test pattern data. This is a problem.

SUMMARY OF THE INVENTION

The present invention is intended to solve the foregoing prior art problem, and its prime object is to provide a test pattern signal generator which is compact and inexpensive through the drastic reduction of hardware components.

The test pattern signal generator based on this invention comprises a horizontal memory which is accessed by being addressed by the count value of a horizontal counter, which counts dot clocks up to the value of the horizontal period, and adapted to read out information in each access including a signal which represents the horizontal sync pulse and a signal which represents the horizontal direction of test pattern, a vertical memory which is accessed by being addressed by the count value of a vertical counter, which counts scanning lines up to the value of the vertical period, and adapted to read out information in each access including a signal which represents the vertical sync pulse and a signal which represents the vertical direction of test pattern, and an output circuit which combines the outputs of the horizontal and vertical memories thereby to compose a test pattern signal.

The test pattern signal generator based on another form of this invention comprises a horizontal memory which is accessed by being addressed by the count value of a horizontal counter, which counts dot clocks up to the value of the horizontal period, and adapted to read out information in each access including a signal which represents the horizontal sync pulse and a signal which represents the horizontal direction of test pattern, a vertical memory which is accessed by being addressed by the count value of a vertical counter, which counts scanning lines up to the value of the vertical period, and adapted to read out information in each access including a signal which represents the vertical sync pulse and a signal which represents the vertical direction of test pattern, and an output circuit which composes a luminance signal, chrominance signal and data signal of a test pattern from the outputs of the horizontal and vertical memories.

BRIEF DESCRIPTION OF THE DRAWINGS

IGS. 4(a) and 4(b) are timing charts showing the timing relation among the vertical sync signal, horizontal sync signal and data display area.

DETAILED DESCRIPTION OF THE PREFERRED EMBODIMENTS

Figure 5:
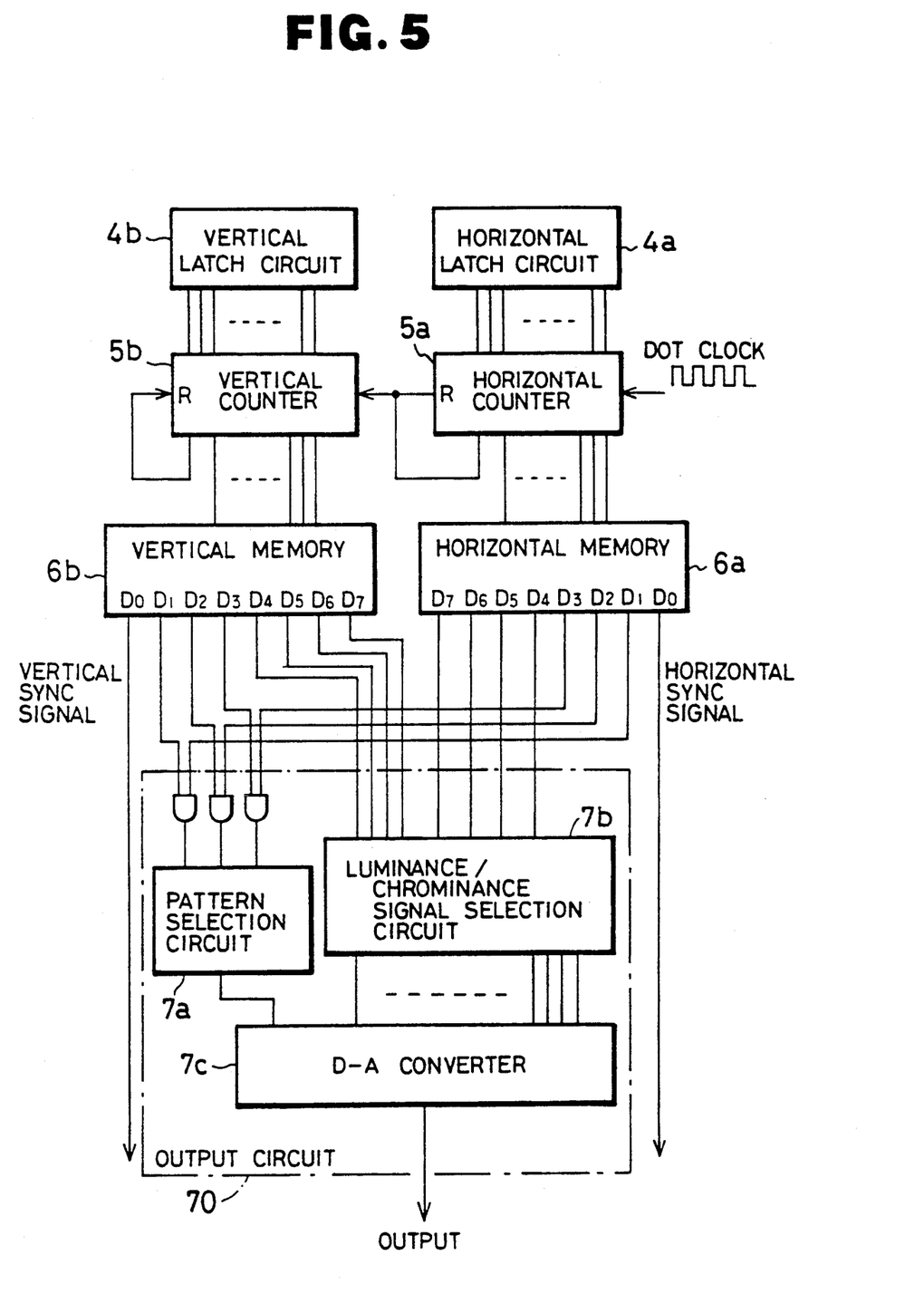
FIG. 5 is a block diagram showing the test pattern signal generator based on an embodiment of this invention.

An embodiment of this invention will be described with reference to the drawings. In FIG. 5, symbol 4a denotes a horizontal latch circuit which sets the number of dot clocks "a" in a horizontal period of the display monitor under test to a horizontal counter 5a, and 4b is a vertical latch circuit which sets the number of scanning lines "A" in a vertical period to a vertical counter 5b. The horizontal counter 5a advances the contents in response to each reception of a dot clock until it has counted the number of dot clocks "a" which was set by the horizontal latch circuit 4a, and then produces a count-up signal, by which it is cleared. The vertical counter 5b advances the contents in response to each reception of a count-up signal from the horizontal counter 5a until it has counted the number of scanning lines "A" which was set by the vertical latch circuit 4b, and then produces a count-up signal to clear itself.

Indicated by 6a is a horizontal memory which is addressed by the count value of the horizontal counter 5a, and adapted to read out information in each access including a signal which represents the horizontal sync signal and a signal which represents the horizontal direction of a test pattern. Indicated by 6b is a vertical memory which is addressed by the count value of the vertical counter 5b, and adapted to read out information in each access including a signal which represents the vertical sync signal and a signal which represents the vertical direction the test pattern. Indicated by 70 is an output circuit which composes a luminance signal, chrominance signal and data signal of a test pattern from the information read out of the horizontal memory 6a and vertical memory 6b. The output circuit 70 includes a pattern selection circuit 7a for selecting a data signal, a luminance/chrominance signal selection circuit 7b, and a D-A converter 7c.

Next, typical operation will be explained. The counter 5a is set to the number of dot clocks "a" which corresponds to the horizontal sync period provided by the latch circuit 4a. The horizontal counter 5a counts dot clocks and delivers the count value to the horizontal memory 6a, which clears itself when it has counted "a". Consequently, the horizontal memory 6a is accessed periodically by being addressed by the count values "0" through "a" of the counter 5a.

Figure 6:
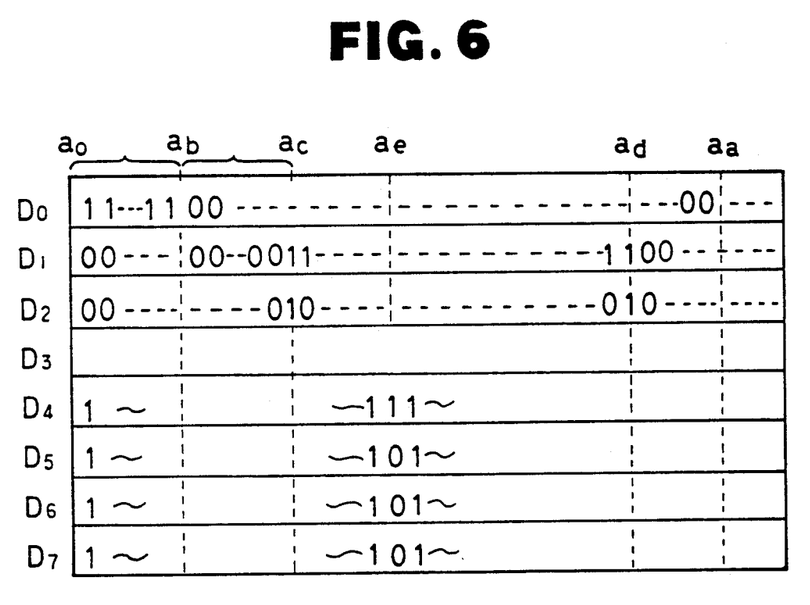
FIG. 6 is a diagram explaining the contents of the horizontal memory.

FIG. 6 shows an example of the content of information of one-byte length, for example, which is read out of the horizontal memory 6a in each access. The one-byte information consists of bit $D_0$ assigned to the signal which represents the horizontal sync signal, bits $D_1$–$D_3$ assigned to the signal which represents the data signal, and bits $D_4$–$D_7$ assigned to the signal which represents the luminance signal. Specifically, the horizontal memory stores "1"s from address 0 to b and "0" for the remaining addresses at bit $D_0$. Accordingly, the horizontal memory 6a delivers at bit $D_0$ a horizontal sync signal which is "1" until the count value of the counter 5a reaches "b" and delivers "0"s for the rest of the count period, as shown by FIG. 7(a).

Figures 7A, 7B, 7C:
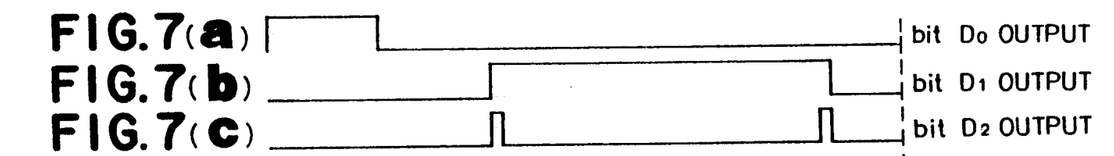
FIGS. 7(a) through 7(g) are timing charts showing the waveforms of output bits of the horizontal memory.
Figures 7D, 7E, 7F:
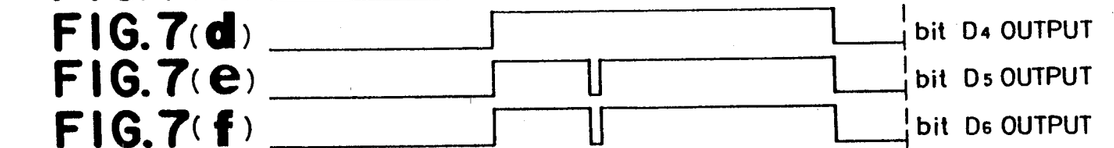
Figure 7G:
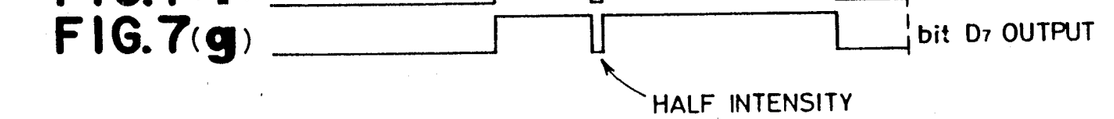
Figure 8:
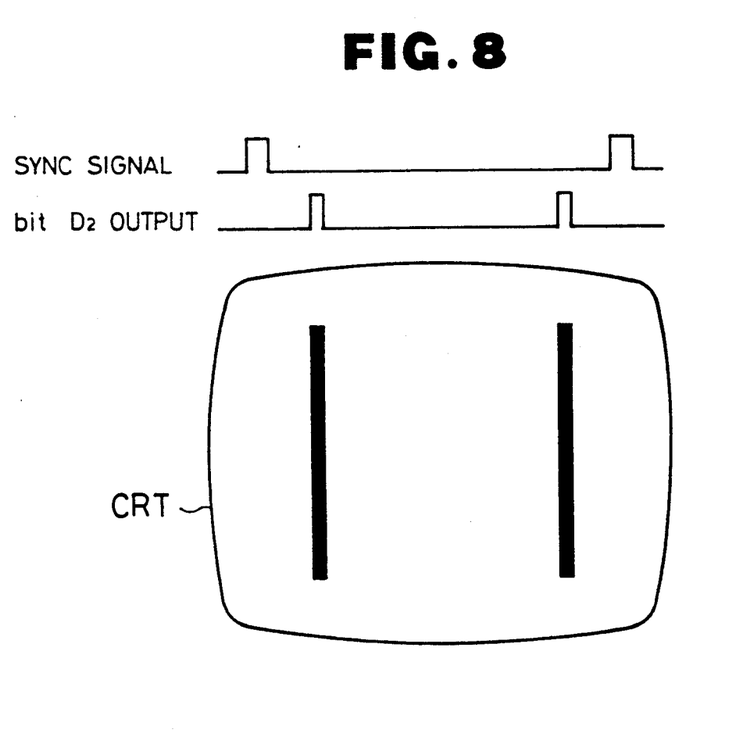
FIG. 8 is a diagram explaining an example of display of vertical lines.

Similarly, by storing "1"s from address c to d and "0"s for the remaining address at bit $D_1$, a data signal which represents the data display range in, the horizontal direction is read out as shown by FIG. 7(b). By storing "1"s for addresses c and d and "0"s for the remaining addresses at bit $D_2$, a data signal which activates only these points is read out as shown by FIG. 7(c). As a result of vertical scanning, two vertical lines are displayed at the right and left ends of the data display area as shown in FIG. 8.

By storing "1", "0", "0" and "0" for address e at bits $D_4$, $D_5$, $D_6$ and $D_7$ for the luminance signal, with the remaining addresses being set to "1", as shown by FIG. 7(d) to 7(g), the intensity of the corresponding section is reduced to half that of other section. By using the luminance signal for the chrominance signals of red, blue and green, it becomes possible to control the display color of arbitrary positions in the horizontal direction.

The vertical operation is essentially identical to the horizontal operation. The vertical counter 5b, with the number of scanning lines "A" in one vertical period being set by the vertical latch circuit 4b, counts count-up signals from the horizontal counter 5a, and it clears itself when it has counted "A". Consequently, the vertical memory 6b is accessed periodically by being addressed by the count values "0" through "A" of the counter 5b.

Figure 9:
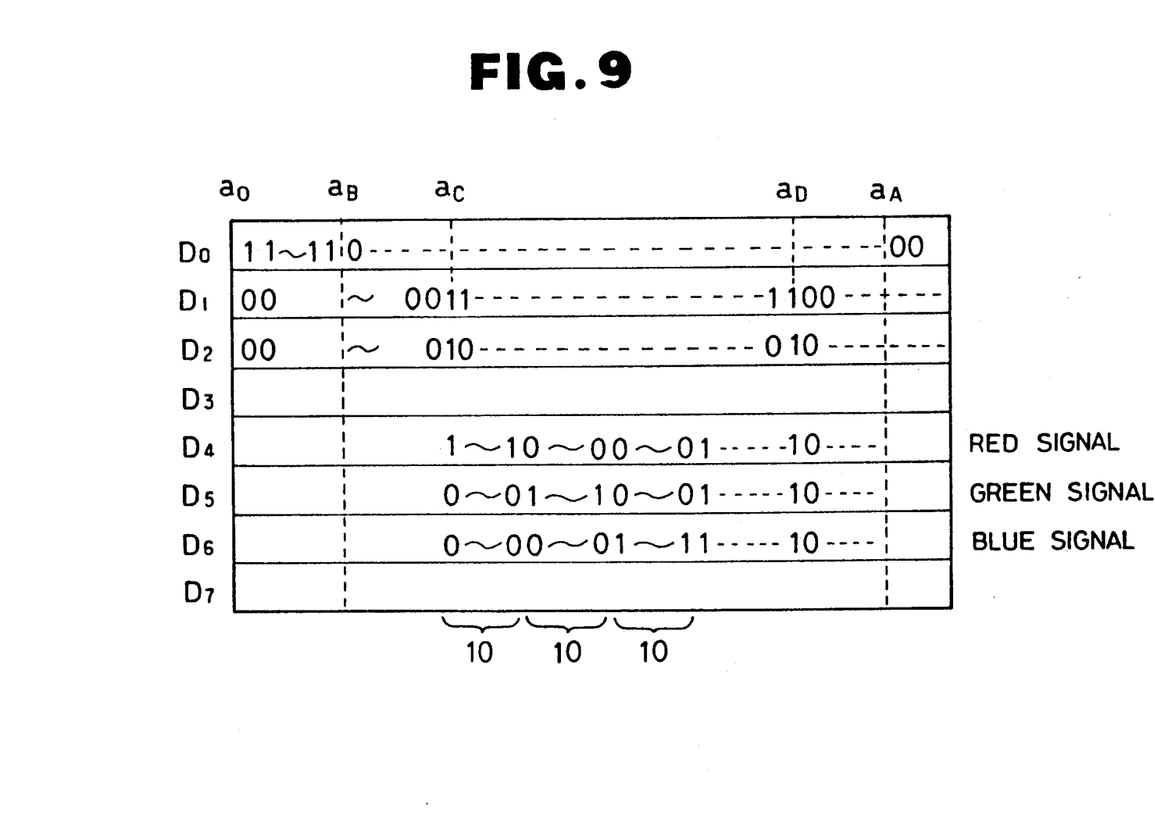
FIG. 9 is a diagram explaining the contents of the vertical memory.

FIG. 9 shows an example of the content of information of one-byte length which is read out of the vertical memory 6b in each access. The one-byte information consists of bit $D_0$ assigned to the signal which represents the vertical sync signal, bits $D_1$–$D_3$ assigned to the data signal, and bits $D_4$–$D_7$ assigned to the signal which represents the luminance signal or chrominance signal.

Figures 10A, 10B, 10C, 10D, 10E, 10F:
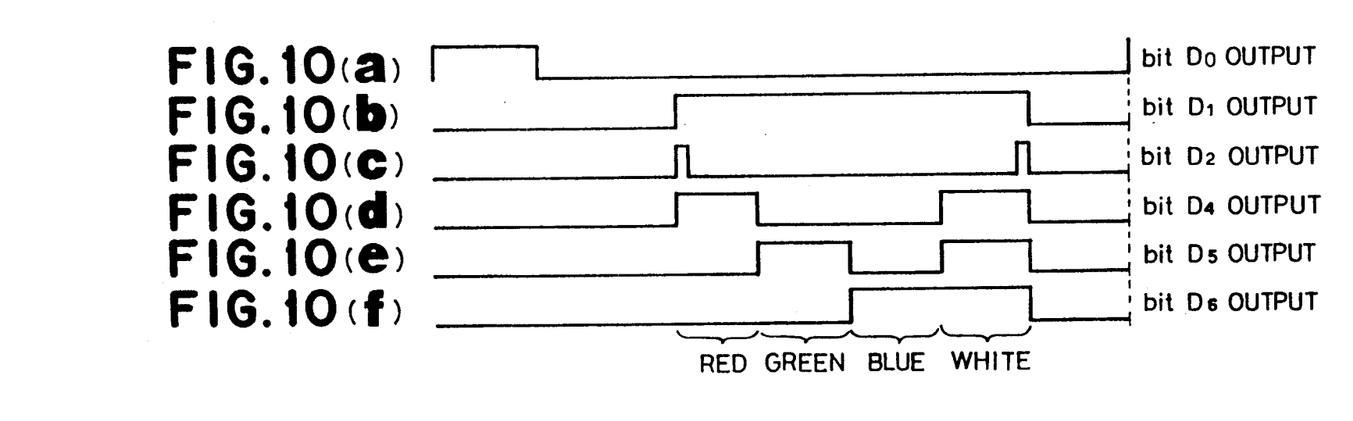
FIGS. 10(a) through 10(f) are timing charts showing the waveforms of output bits of the vertical memory.
Figure 11:
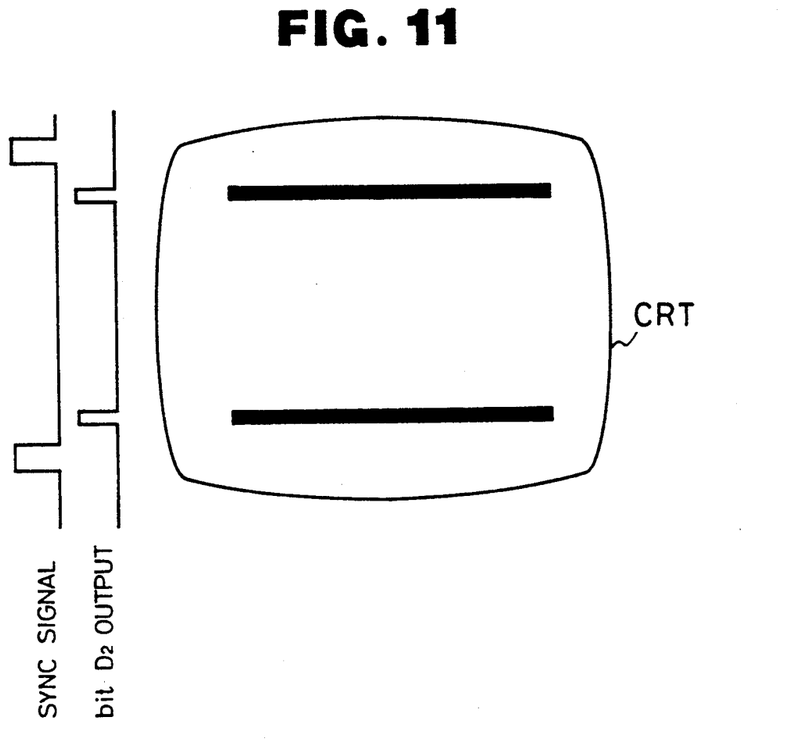
FIG. 11 is a diagram explaining an example of display of horizontal lines.

The vertical memory stores "1"s from address 0 to B and "0" for the remaining addresses at bit $D_0$, and it delivers a vertical sync signal as shown by FIG. 10(a). Similarly, by storing "1"s for only addresses C and D at bit $D_2$, the memory delivers a data signal shown by FIG. 10(c). Since this signal does not vary during the horizontal scanning operation, it displays two horizontal lines at the top and bottom of the data display area as shown in FIG. 11.

By using bits $D_4$ through $D_7$ for the luminance signal or chrominance signal, it becomes possible to specify the intensity or color of arbitrary vertical positions in the data display area. In the example of FIGS. 10(a) through 10(f) the bits $D_4$–$D_6$ represent the color signals of red, green and blue, respectively.

Specifically, only bit $D_4$ is set to "1" for 10-bytes data stored in the vertical memory 6b starting at address C, only bit $D_5$ is set to "1" for the successive 10-bytes data, only bit $D_6$ is set to "1" for the successive 10-bytes data, and all of bits $D_4$–$D_6$ are set to "1" for the successive 10-bytes data. Consequently, colors of red, green, blue and white are displayed as shown by FIGS. 10(d) through 10(f). The bits $D_1$–$D_7$ of the one-byte information read out of the horizontal memory 6a and vertical memory 6b are delivered to the output circuit 7, by which bit data are composed into a test pattern signal.

Figure 12:
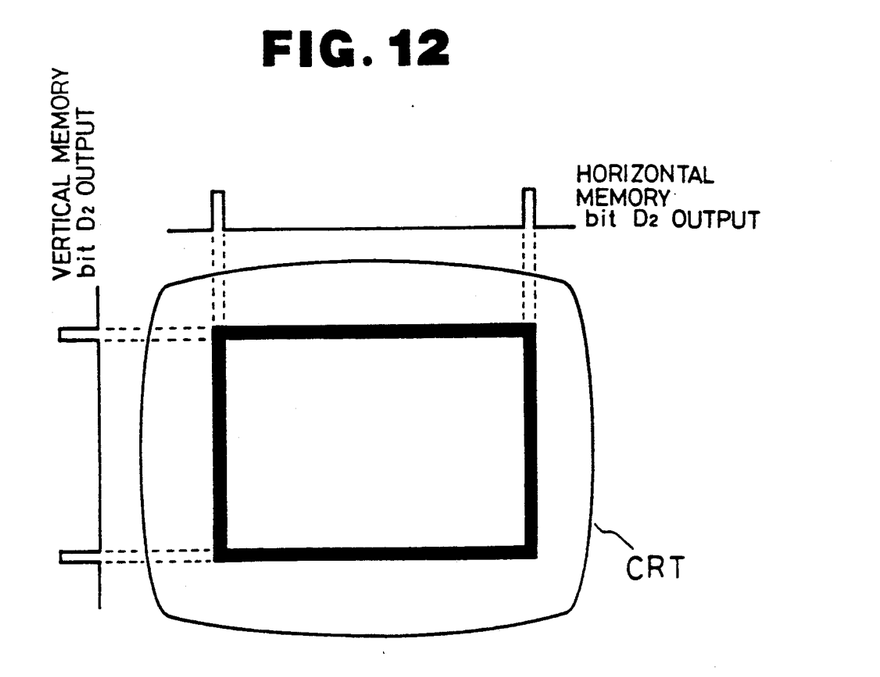
FIG. 12 is a diagram explaining an example of composition of the outputs of the horizontal and vertical memories.
Figure 13:
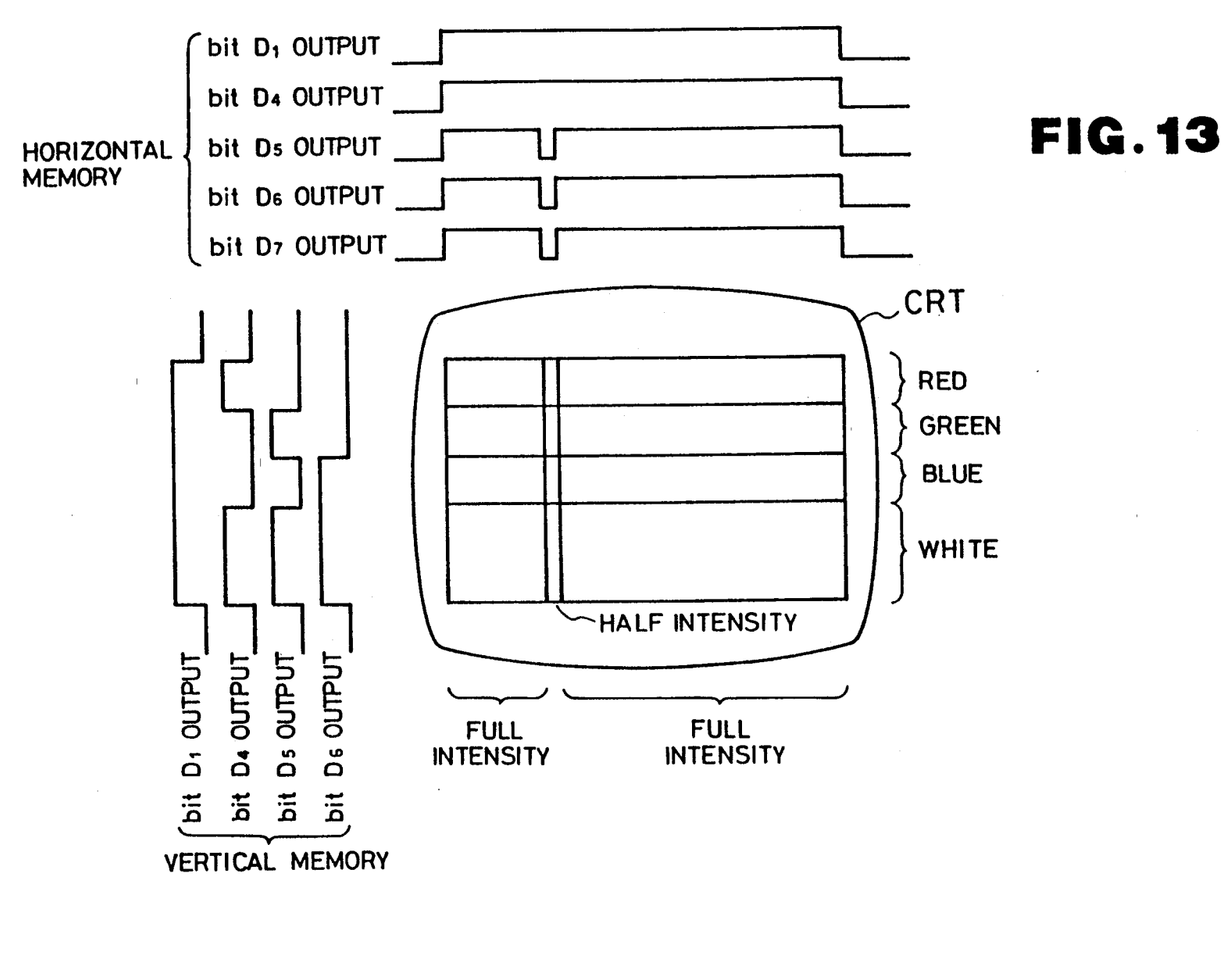
FIG. 13 is a diagram explaining another example of composition of the outputs of the horizontal and vertical memories.

Composing the signals from bit $D_2$ of the horizontal memory 6a and vertical memory 6b enables a display of the vertical lines and horizontal lines in combination on the screen as shown in FIG. 12, and by composing the signals from bits $D_4$–$D_7$ of the horizontal memory 6a and bits $D_4$–$D_7$ of the vertical memory 6b, it is possible to control the intensity and color of a test pattern at arbitrary vertical and horizontal positions on the screen as shown in FIG. 13.

Figure 14:
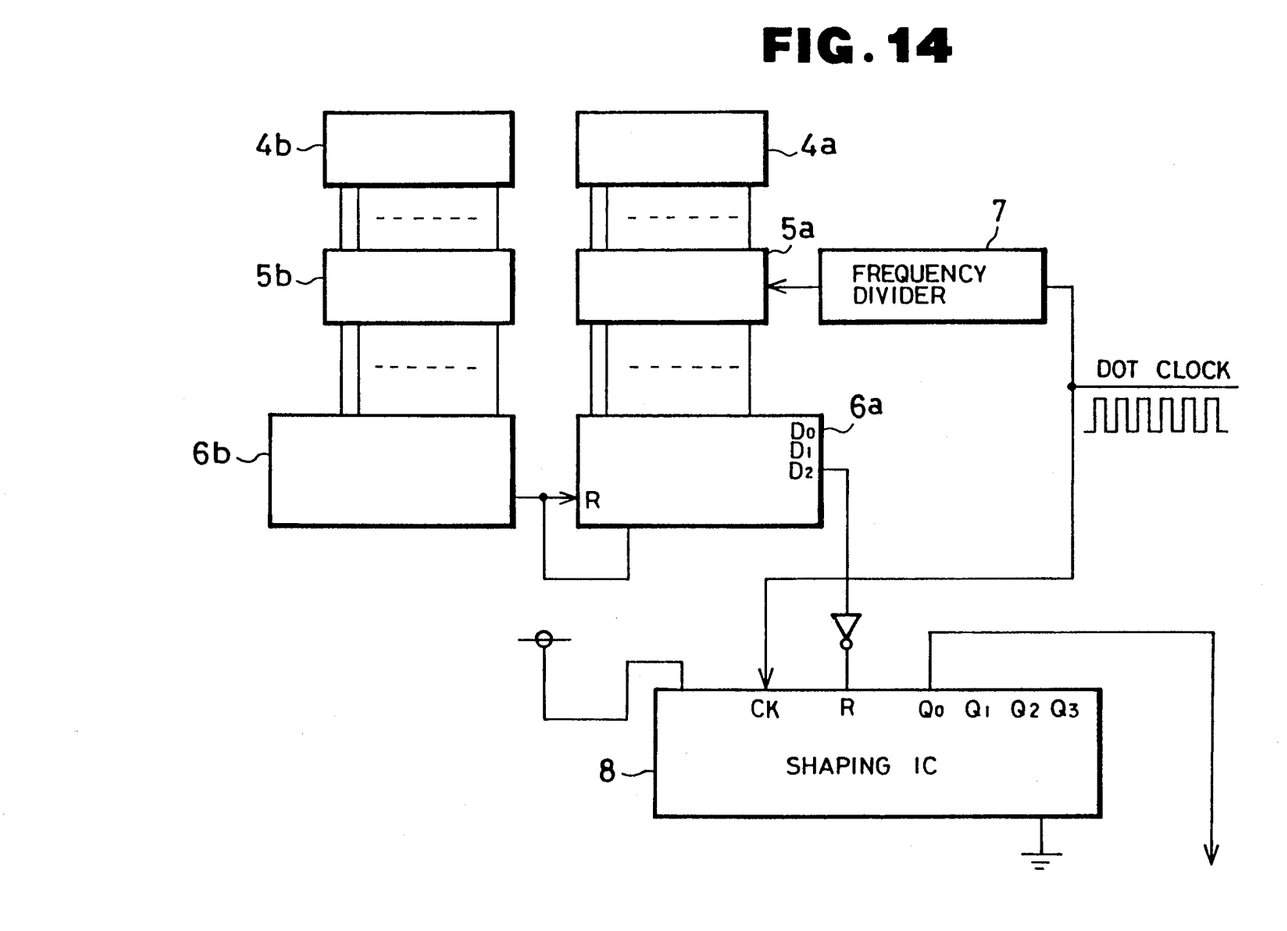
FIG. 14 is a block diagram showing another embodiment of this invention.

In the foregoing embodiment, the horizontal counter 5a counts dot clocks, however, the access time of currently available memories is about 30 ns or longer and therefore the dot clock signal is limited to about 30 MHz. In case it is intended to deal with a dot clock signal of 50 MHz for example, a possible scheme shown in FIG. 14 is to provide a frequency divider 7 so that the dot clock signal is divided down to 25 MHz and then counted by the horizontal counter 5a. In this case, the horizontal memory 6a and vertical memory 6b are loaded in accordance with the timing chart which is based on the halved dot clock.

Figures 15A, 15B, 15C:
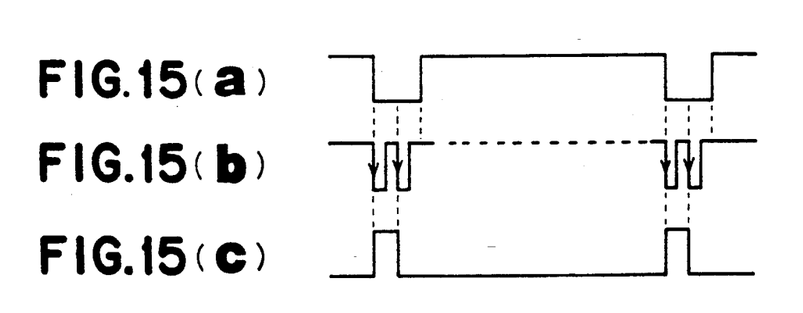
FIGS. 15(a) through 15(c) are a timing charts showing the operation of the embodiment shown in FIG. 14.

In addition, when a vertical line is displayed based on the output of bit $D_2$ of the horizontal memory 5a, the width of line is doubled due to the dot clock of double width, and therefore the embodiment of FIG. 14 is designed to correct the width of vertical line by using an IC device for shaping. The shaping IC device 8 in FIG. 14 is type 74F393 for example. The IC device 8 receives on its terminal R the inverted version of the signal from bit $D_2$ of the horizontal memory 5a, as shown by FIG. 15(a), and receives dot clocks shown by (b) on its terminal CK. The IC device 8 performs the count operation for dot clocks CK only during a low R signal and produces on its terminal $Q_0$ a signal having a width equal to the period of dot clock as shown by FIG. 15(c). The shaped bit output is used thereafter in the same manner as the output $D_2$ of the horizontal memory 5a in the preceding embodiment. For the vertical memory output, no modification is needed. This modified arrangement produces the virtually same test patterns as the case of the preceding embodiment.

As described above, based on the arrangement of composing a signal included in the information read out of the horizontal memory and a signal included in the information read out of the vertical memory, it becomes possible to reduce significantly hardware components such as counters and the capacity of memory, and a compact and inexpensive test pattern signal generator can be accomplished.

Also in the case of composing a test pattern signal including the luminance and chrominance signals from the signal included in the information read out of the horizontal memory and the signal included in the information read out of the vertical memory, it becomes possible to reduce significantly hardware components such as counters and the capacity of memory, and a compact and inexpensive test pattern signal generator can be accomplished.

What is claimed is:

1. A test pattern signal generator comprising:
   a horizontal counter which counts dot clocks and is cleared by a count-up signal that is produced when a horizontal count value reaches a number of dot clocks in a horizontal period;
   a vertical counter which counts count-up signals of said horizontal counter and is cleared by a count-up signal that is produced when a vertical count value reaches the number of scanning lines in a vertical period;
   a horizontal memory which is accessed by being addressed by the horizontal count value of said horizontal counter to read out information including a first horizontal signal as a horizontal sync signal and a second horizontal signal which represents a horizontal direction of a test pattern;
   a vertical memory which is accessed by being addressed by the vertical count value of said vertical counter to read out information including a first vertical signal as a vertical sync signal and a second vertical signal which represents a vertical direction of said test pattern; and
   an output circuit which produces a test pattern signal on the basis of said second horizontal signal and said second vertical signal.

2. A test pattern signal generator comprising:
   a horizontal counter which counts dot clocks and is cleared by a count-up signal that is produced when a horizontal count value reaches a number of dot clocks in a horizontal period;
   a vertical counter which counts count-up signals of said horizontal counter and is cleared by a count-up signal that is produced when a vertical count value reaches the number of scanning lines in a vertical period;
   a horizontal memory which is accessed by being addressed by the horizontal count value of said horizontal counter to read out information including a first horizontal signal as a horizontal sync signal, a second horizontal signal which represents a horizontal direction of a test pattern and a third horizontal signal which represents a luminance signal and/or chrominance signal;

a vertical memory which is accessed by being addressed by the vertical count value of said vertical counter to read out information including a first vertical signal as a vertical sync signal, a second vertical signal which represents a vertical direction of the test pattern and a third vertical signal which represents a luminance signal and/or chrominance signal; and an output circuit which produces a luminance signal, a chrominance signal and a data signal of the test pattern on the basis of said second horizontal signal, said third horizontal signal, said second vertical signal, and said third vertical signal.

3. A test pattern signal generator according to claim 1 or 2, wherein said horizontal memory stores data indicative of a data display range in the horizontal direction and said vertical memory stores data indicative of the data display range in the vertical direction.

4. A test pattern signal generator according to claim 3 further comprising:

a frequency divider which divides a frequency of said dot clocks and supplies resulting dot clocks to said horizontal counter; and an IC device which operates to narrow a valid period of a signal representative of a data display range in the horizontal direction read out of said horizontal memory.

5. An apparatus as claimed in claim 1 wherein said output circuit comprises:

a pattern selection circuit, responsive to said second horizontal signal and said second vertical signal, for selecting a pattern of said test pattern on the basis of said second horizontal signal and said second vertical signal.

6. An apparatus as claimed in claim 2 wherein said output circuit comprises:

a pattern selection circuit, responsive to said second horizontal signal and said second vertical signal, for selecting a pattern of said test pattern on the basis of said second horizontal signal and said second vertical signal.

7. An apparatus as claimed in claim 6, wherein said output circuit further comprises a luminance/chrominance signal selection circuit directly connected to said vertical memory and said horizontal memory for selecting luminance and/or chrominance of said test pattern on the basis of said third horizontal signal and said third vertical signal.

* * * * *